April 15, 1958
S. R. STILES
2,831,043
ALKYLATION PROCESS WITH PURIFICATION OF
SPENT SULFURIC ACID
Filed Sept. 1, 1954
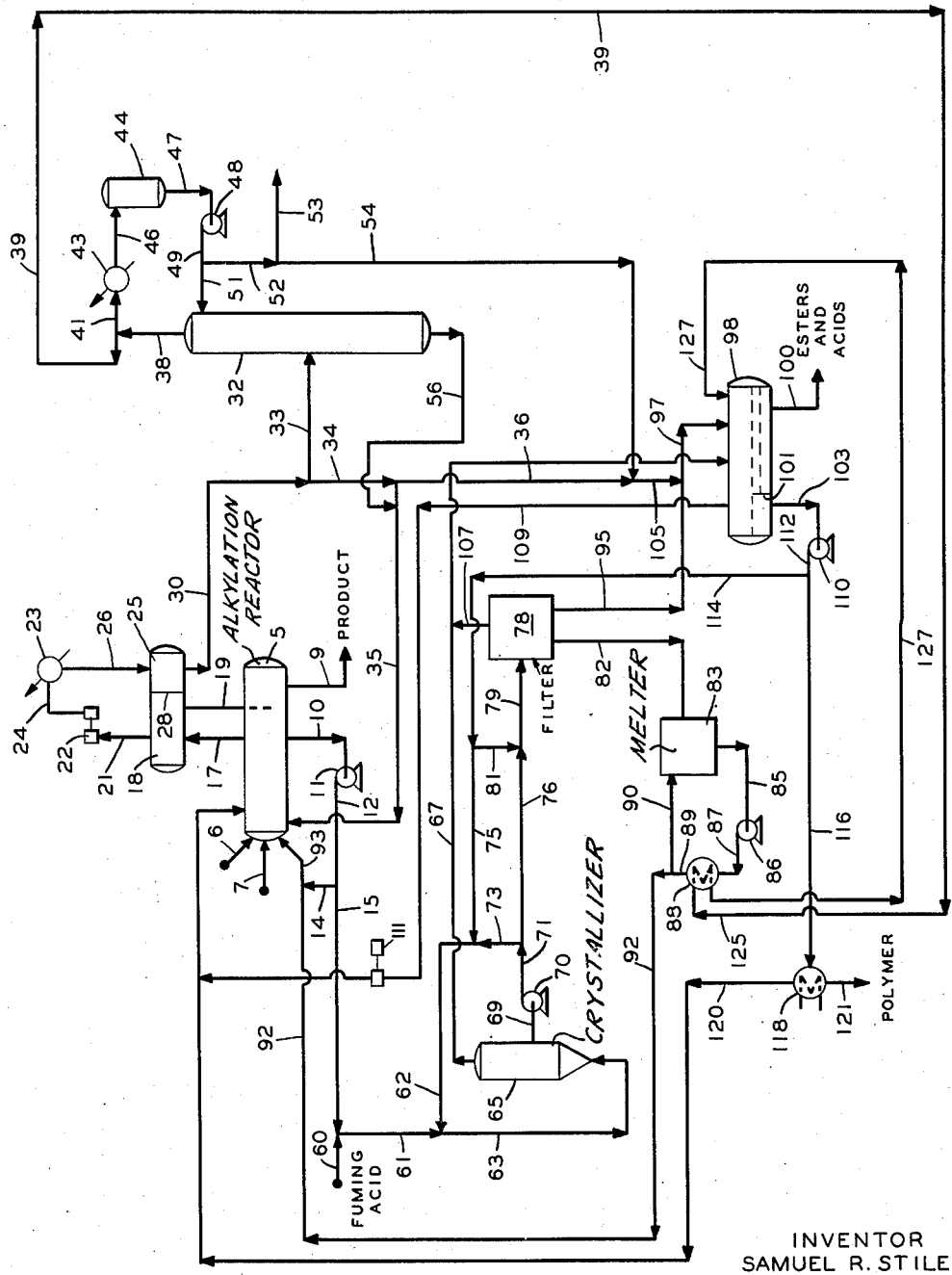
INVENTOR
SAMUEL R. STILES
BY *D. H. Palmer*
*T. C. Virgil*
ATTORNEYS

United States Patent Office 2,831,043
Patented Apr. 15, 1958

2,831,043

ALKYLATION PROCESS WITH PURIFICATION OF SPENT SULFURIC ACID

Samuel R. Stiles, Cresskill, N. J., assignor to The M. W. Kellogg Company, Jersey City, N. J., a corporation of Delaware Application September 1, 1954, Serial No. 453,461

6 Claims. (Cl. 260—683.62)

This invention relates to an improved method for the purification of sulfuric acid which is employed in the alkylation of an isoparaffin and an olefin and, more particularly, it pertains to an integrated process involving the alkylation of an olefin and an isoparaffin and an operation involving the purification of spent sulphuric acid by crystallization.

In the alkylation of an isoparaffin and an olefin for the production of high octane quality alkylate, the sulfuric acid becomes contaminated with polar and/or non-polar compounds as well as water, thus it is necessary to subject the same to a purification treatment. It has been proposed heretofore to effect the purification treatment by means of crystallization whereby the spent acid is crystallized in the presence of a spacer material which is capable of being volatilized and thereby provide the means for maintaining refrigeration temperatures. In the usual alkylation process, isobutane is reacted with butylene, and/or propylene, and/or amylene to produce the desired alkylate product. By virtue of the impure state of the olefin supply, propane and butane are also present therewith and it is desirable to provide means for the separation of these materials in the recovery system of the alkylation process. Since the alkylation process is carried out at relatively low pressures, e. g., 5 to 15 p. s. i. g., it is desirable to utilize propane alone or a mixture of propane and isobutane as the auto-refrigeration means in the spent acid purification operation. At the pressures contemplated in the crystallization step, the quantity of isobutane which is present in the stream obtained from the alkylation treatment is excessive, consequently, in the case of the mixture of hydrocarbons, it is desirable to provide an integrated process for the production of an isobutane and propane mixture which will serve as auto-refrigeration means in the recovery or purification operation. By means of this invention, an economical and effective method is provided for this purpose.

An object of this invention is to provide an improved method for the purification of sulfuric acid which is utilized for the alkylation of an isoparaffin and an olefin.

Another object of this invention is to provide an integrated process of alkylating an isoparaffin and olefin by means of sulfuric acid and the purification of the spent acid obtained therefrom, whereby a hydrocarbon product stream serves as the auto-refrigeration means.

In accordance with the present invention, a normally gaseous paraffinic hydrocarbon which is derived from the alkylation of an isoparaffin and an olefin by means of sulfuric acid in a separate alkylation zone is passed to a crystallization zone wherein spent sulfuric acid from the alkylation process is crystallized by vaporization of the normally gaseous hydrocarbon and the vaporized normally gaseous hydrocarbon is passed to the alkylation zone. For the purposes of this specification and the appended claims, a normally gaseous paraffinic hydrocarbon is one containing not more than three carbon atoms and a normally liquid paraffinic hydrocarbon contains at least four carbon atoms and it can contain as high as six carbon atoms.

The normally gaseous hydrocarbon is present as an impurity in the hydrocarbon feed to the alkylation reaction, consequently provision is made for the separation of such material to prevent build up within the system. The normally gaseous hydrocarbon becomes vaporized in the alkylation reactor along with normally liquid paraffins. The vaporized material is recondensed by compression and part of the same is recycled to the reactor as an auto-refrigerant stream, whereas, the remaining part is subjected to a separation treatment for the removal of normally gaseous paraffins. For the purpose of this invention, the normally gaseous hydrocarbon alone or a mixture of normally gaseous and liquid hydrocarbons can be utilized as the auto-refrigerant for the crystallization of spent sulfuric acid. Where a very low crystallization temperature is sought, e. g., at or below about −40° F., the normally gaseous paraffin may be used alone as the auto-refrigerant depending on the pressure in the system. On the other hand, where higher temperatures are used, e. g., more than about −40° F. to 0° F., then a mixture of normally gaseous and liquid paraffins is employed.

By means of the present invention, the mixture of normally liquid paraffinic hydrocarbon and normally gaseous paraffinic hydrocarbon which is produced in the alkylation of an isoparaffin and an olefin by means of sulfuric acid is utilized as auto-refrigeration means by the method comprising subjecting a part of said mixture to a separation treatment for the production of a normally gaseous paraffinic hydrocarbon fraction and a normally liquid paraffinic hydrocarbon fraction, combining at least part of the normally gaseous hydrocarbon fraction and part of the mixture of normally gaseous and normally liquid hydrocarbons in proportions sufficient to provide auto-refrigeration, passing the auto-refrigeration mixture and spent sulfuric acid to a crystallization zone wherein crystals of sulfuric acid are produced by vaporization of at least part of the normally gaseous paraffinic hydrocarbon and passing the vaporized gaseous hydrocarbon to the alkylation reaction zone.

The alkylation of isoparaffinic hydrocarbons with olefinic hydrocarbons is conducted by means of sulfuric acid at temperatures ranging from about 15° to 75° F., preferably, 25° to about 50° F., and at a pressure of about 1 atmosphere to about 50 p. s. i. g., preferably, 1 atmosphere to about 15 p. s. i. g. In general, the isoparaffin can contain at least four carbon atoms in the molecule such as, for example, isobutane, which, for the purposes hereunder, it can be designated as a normally liquid paraffinic hydrocarbon. The other reactant material is a monoolefin and it can contain at least three carbon atoms, although more usually, it contains at least four carbon atoms such as, for example, butylene, and of the butylenes, butylene-2 is the preferred material. By virtue of the low temperature which is desired in the alkylation reaction zone, it is customary to effect partial vaporization of the hydrocarbon material for the purpose of cooling the reaction mixture to the desired level. For this purpose, the vaporized paraffinic hydrocarbon is passed to a surge drum or liquid separating drum and thence, it is compressed to the liquid state by suitable means prior to being recycled to the alkylation reaction zone. By virtue of the highly reactive nature of the olefins, the volatilized hydrocarbon is comprised essentially of paraffinic material.

The relative quantities of reactant hydrocarbons in the alkylation reaction can be expressed as the volumetric ratio of isoparaffin to olefin of generally about 5 to 40:1, more usually, 10 to 20:1. The olefinic feed contains normally gaseous hydrocarbon material which serves little or no useful purpose in the alkylation process, and in order to avoid a gradual build-up of normally gaseous paraffinic hydrocarbon material in the system, provision is made for the removal of this material. Accordingly, a portion of the condensed hydrocarbons serving as the auto-refrigeration means for the alkylation process is passed to a suitable separation zone wherein the normally gaseous paraffinic hydrocarbon material is removed. The separated normally liquid paraffinic hydrocarbon material is recycled to the alkylation zone along with another portion of condensed hydrocarbons which have not been subjected to the separation treatment. In view of the fact that the alkylation system contains suitable compression means, it is proposed hereunder to integrate the acid purification system with the alkylation operation whereby the compression means are also employed for the purpose of re-condensing or liquefying the hydrocarbon materials serving as the auto-refrigeration means for the crystallization of spent sulfuric acid. It is also contemplated by means of this invention to employ hot vapors of normally gaseous paraffinic hydrocarbon for melting sulfuric acid crystals which have been produced in the purification of spent acid.

The alkylation of isoparaffins with olefins is effected by means of strong sulfuric acid solutions. Generally, the sulfuric acid has a titratable acidity of at least 88%, although more usually, it varies from about 92 to about 96%. By virtue of the alkylation reaction, the acid becomes contaminated with monoalkyl sulfate, dialkyl sulfate and high molecular weight polymers which are probably formed by the polymerization of the olefin. The efficacy of the acid diminishes as the concentration of impurities increases, therefore, it is necessary to increase the acid strength or purity in order that the acid can be re-used for the alkylation process. For this purpose, it is contemplated by means of this invention to subject the sulfuric acid to a crystallization treatment whereby crystals of 100% purity are produced and these crystals are melted for further use in the alkylation process. Low temperatures are employed in the crystallization step and, for the purpose of temperature control, a normally gaseous paraffinic hydrocarbon alone or in admixture with a normally liquid paraffinic hydrocarbon is employed. It is desired to operate the crystallization step at low pressures in the order of about 1 atmosphere, or in the range of about 0 to 30 p. s. i. g., and at a temperature in the range of about $-60°$ to about $0°$ F. At the desired operating pressure of the acid crystallizer, the use of normally gaseous paraffin alone would result in a temperature below $-44°$ F., whereas, the use of the normally liquid paraffin in admixture therewith would produce a temperature of about $-44°$ F. to $0°$ F. Accordingly, to control higher crystallization temperatures, it is desirable to employ a mixture of normally liquid paraffin and normally gaseous paraffin wherein the normally gaseous paraffin constitutes about 10 to 98 mol percent of the mixture.

In order to provide a better understanding of this invention, reference will be had to the drawing which forms a part of this specification.

In the drawing, the olefin feed mixture is charged to the alkylation reactor 5 by means of line 6 at the rate of 478 barrels per day of butylene, 380 barrels per day of isobutane, 289 barrels per day of normal butane, 301 barrels per day of propylene and 332 barrels per day of propane. The paraffinic hydrocarbon feed is supplied to the alkylation reactor 5 by means of line 7 and it furnishes additional isobutane at the rate of 554 barrels per day and n-butane at the rate of 61 barrels per day. In the alkylation reactor 5, the temperature is maintained in the range of about $25°$ to about $55°$ F. at a pressure varying from about 5 to about 12 p. s. i. g. The reaction product is withdrawn from the bottom of the alkylation reactor by means of line 9. Sulfuric acid is also withdrawn from the bottom of the reactor by means of line 10, and it is transported by means of pump 11 through line 12, and then it is divided so that about 23,000 pounds per hour are recycled by mean of line 14 and the remaining 1700 pounds per hour are passed through line 15 for purification as will be discussed in greater detail hereinbelow. The temperature of the alkylation reaction is maintained by vaporization of part of the hydrocarbon material. The vaporized hydrocarbon comprising essentially $C_3$ and $C_4$ paraffins is discharged from the top of the reactor by means of line 17, and it is passed to a liquid separating drum 18. Any liquid which is entrained with the gaseous hydrocarbons is returned to the alkylation reactor by means of line 19, interconnecting the bottom of the separating drum 18 with the alkylation reactor. The vaporized paraffins are discharged from the top of separating drum 18 by means of line 21, and thence they are passed to a compressor 22 wherein they are elevated in pressure. The warm high pressure paraffins are discharged from compressor 22 to a condenser 23 by means of line 24 wherein they are liquified. The cooled liquid mixture of paraffins is passed to a surge drum 25 by means of line 26. Surge drum 25 is an integral part of a unitary vessel which also contains separating drum 18 and these drums are separated by a baffle or wall 28.

The cooled mixture of paraffins is discharged from the bottom of surge drum 25 by means of line 30. A portion of the liquefied paraffins are charged to a depropanizer column 32 by means of line 33 at the rate of 3550 barrels per day. The remaining portion of condensed paraffins pass through line 34, and thence this stream is divided to provide that about 2680 barrels per day are recycled to the alkylation reactor 5 by means of line 35 and the remaining part, about 10 barrels per day, are earmarked for use in the purification system to be described later by means of line 36. In the depropanizer column, the top temperature is maintained at $70°$ F. to $105°$ F. as limited by cooling water temperature; whereas, the bottom temperature is about $176°$ F. The overhead vapors from the tower pass through line 38 and then a portion thereof is passed at a rate of 653 pounds per hour through line 39 for utility in the purification system to be described later. The remaining propane vapors are passed through line 41, and thence, they are condensed in a cooler 43 prior to being passed to an accumulator 44 by means of line 46. The liquid propane is discharged from the bottom of the accumulator by means of line 47, and thence, it is transported by means of pump 48 through line 49. Part of this liquid propane is recycled to the column as reflux by means of line 51; whereas, the remainder is discharged from the distillation system by means of line 52. A portion of liquid propane is eliminated from the entire system at the rate of 335 barrels per day by means of line 53; whereas, the remaining portion at the rate of 185 barrels per day is introduced into the purification system by means of line 54. A propane and butane product is yielded from the bottom of the depropanizer column 32 by means of line 56 and this material is combined with the refrigerant stream being supplied through line 34 for passage to the reactor 5 through line 35.

The spent sulfuric acid from the alkylation reactor passing through line 15 contains about 1.5% by weight of water. In the crystallization step, the presence of water has an adverse influence upon the amount of acid which is lost in the liquor remaining at equilibrium, consequently, to reduce the loss of acid substantially fuming sulfuric acid is combined with spent acid by means of line 60. The sulfuric trioxide which is present in the fuming sulfuric acid combines with the water and the resultant mixture is low in water content or is substantially free of water. The resulting sulfuric acid solution is passed through line 61 wherein it is then admixed with a recycled slurry of sulfuric acid crystals and liquor through line 62. The recycled slurry of sulfuric acid crystals serves a two-fold purpose of (1) providing a seeding solution to initiate the crystallization of sulfuric acid, and (2) to maintain continuous circulation through the alkylation zone to prevent stratification of hydrocarbon and acid therein. The mixture of recycled material and sulfuric acid is passed through line 63 which is connected to the bottom of the crystallizer 65. The recycled slurry stream contains the fresh supply of liquid propane-isobutane mixture in the quantity necessary to maintain the desired temperature in the crystallization zone. The temperature in the crystallizer is maintained at −35° F. and at essentially atmospheric pressure. Under the conditions existing in the crystallizer, a substantial part of propane is vaporized overhead and this is removed therefrom by means of line 67. A slurry of acid crystals in mother liquor and hydrocarbon spacer is withdrawn from the middle part of the crystallizer by means of line 67 and then it is transported by pump 70 to line 71. A portion of this slurry is recycled in the manner previously indicated through line 73 and a fresh supply of spacer, i. e., propane-isobutane mixture, is combined therewith by means of line 75. The net yield of acid crystal slurry is passed through line 76 prior to being introduced to a centrifugal filter shown schematically as 78 by means of a second line 79 leading thereto. The centrifugal filter is operated in a cyclic manner, that is, after a cake of crystals of desired thickness is formed on the filtering surface, wash liquor is introduced thereto by means of line 81 and line 79 for the purpose of scrubbing any adhering hydrocarbon from the acid crystals, otherwise the wash liquor comprising propane and isobutane of the same composition as used in the crystallizer does not flow through line 81 during the separation of mother liquor from the acid crystals.

In the filter, sulfuric acid crystals are separated from the liquor and scrubbed by means of propane-isobutane mixture. The acid crystals are discharged from the filter by means of line 82 and thence, they are passed to a melter 83. In the melter, the acid crystals are melted by means of heated sulfuric acid which is circulated through the system by being first withdrawn by means of line 85, transported by pump 86 through line 87 to indirect heater 88 and then returned by means of lines 89 and 90. In this manner, a portion of the melted sulfuric acid is employed as the heating means for melting the fresh supply of sulfuric acid crystals. The net production of sulfuric acid is discharged from the purification system by means of lines 89 and 92. The regenerated acid is returned to the alkylation reactor, however, it is admixed with recycled spent acid flowing through line 14 before being admitted to the bottom of the reactor by means of line 93. The filtrate and wash liquor from the filter 78 are discharged therefrom by means of line 95, and thence, this material is passed through line 97 before entering the top of a decanter 98. The decanter serves as a separating means, accumulator and mixing means. In this respect, the filtrate which is discharged from the filter contains sulfuric acid, and high boiling and low boiling hydrocarbon material. Since these materials are immiscible, they are allowed to settle in the decanter such that the sulfuric acid layer containing esters is discharged from the bottom of the decanter by means of line 100. The upper hydrocarbon layer flows over a baffle 101 into a second zone, and it is withdrawn from the bottom thereof by means of line 103. Liquid propane passing through line 54 and condensed vapors of propane and butane passing through line 36 combine as a single stream in line 105, and thence, this stream is combined with the filtrate and wash liquor passing from line 95 to line 97 which lead to the decanter 98. Vaporized hydrocarbon which is present in filter 78 is discharged therefrom by means of line 107, and thence, it combines with the vaporized hydrocarbon in line 67 and as a single stream it passes to the decanter. Hydrocarbon vapor in the decanter 98 is passed to the alkylation reactor by means of line 109 and compressor 111. It can be seen that the decanter serves as a mixing means for all hydrocarbon product streams of the purification system. As a result, the mixture of propane-isobutane being discharged from the bottom of the decanter by means of line 103 has the desired composition for auto-refrigeration means. Accordingly, the mixture of propane-isobutane flowing through line 103 is transported by means of pump 110 through line 112. The hydrocarbon stream in line 112 is divided to provide that a portion passes through line 114 for use in the crystallizer and filter and a small slip stream is passed through line 116. Since a heavy polymer is produced in the alkylation reaction and this material appears in the hydrocarbon stream being used for auto-refrigeration, it is necessary to remove this material from the purification system at the same rate that it is being introduced thereto. For this purpose, the slip stream of hydrocarbon is passed to a heater 118 wherein a portion of the vaporizable hydrocarbon, namely, propane and butane is discharged overhead therefrom as vapor by means of line 120 and the heavy polymer along with remaining light liquid hydrocarbon material is yielded from the bottom of the heater through line 121. The hot propane vapors coming from the top of the depropanizer column 32 and which pass through line 39, and thence, they circulate through heater 88 in order that the heat of the vapors is exchanged indirectly with the sulfuric acid where they are condensed and serve as the heating means for melting sulfuric acid crystals. The liquid leaving exchanger 88 passes through line 127 and thence enters the top of decanter 98.

An important modification of the above process is concerned with partial integration of the acid purification step with the alkylation operation. It is to be noted that in the above description the vaporized auto-refrigerant from the crystallizer is passed directly to the alkylation reactor, and thereafter, the refrigerant is processed through the alkylation system as part of the total refrigerant material. In the partially integrated system, the vaporized auto-refrigerant from the crystallizer 65 is first raised in pressure by means of a separate compressor designated for the purpose, and then it is lowered in temperature for condensation by indirect exchange with the condensed refrigerant material being recycled to the alkylation reactor such as, for example, the material in line 35. Accordingly, the recondensed auto-refrigerant is circulated back to the accumulator 98 and thereafter used in the manner described hereinabove. The loss of normally gaseous paraffinic hydrocarbon is replenished by the stream of such material which is supplied from the overhead of depropanizer 32 and used in exchanger 98 for heating indirectly sulfuric acid. This hydrocarbon material can also be replenished from the propane product stream of the depropanizer 32. The normally liquid hydrocarbon when used in admixture with the normally gaseous material is replenished from line 36. In both types of systems, the feature in common is that the propane impurity alone or in admixture with the normally liquid paraffin which is used as the auto-refrigerant means is derived from the alkylation operation and the cooling load for the auto-refrigerant used in the crystallizer is carried at least in part by the auto-refrigeration system of the alkylation reactor. All conditions described above in connection with the wholly integrated system also apply to the partially integrated system.

Having thus provided a description of my invention along with a specific example thereof, it should be understood that no undue limitations or restrictions are to be imposed by reason thereof, but that the scope of this invention is defined by the appended claims.

I claim:

1. In an alkylation process where a normally liquid isoparaffin is reacted with an olefin in an alkylation zone to produce an alkylate by means of sulfuric acid and a normally gaseous paraffinic hydrocarbon is present in at least one of the reactant streams, the sulfuric acid becomes spent and at least part of the normally gaseous hydrocarbon and normally liquid hydrocarbon are vaporized, the improvement which comprises condensing the vaporized hydrocarbons, subjecting at least a portion of the condensed hydrocarbons to a separation treatment for the separation of a liquefied normally gaseous hydrocarbon fraction, passing a portion of the liquefied normally gaseous hydrocarbon fraction to a crystallization zone to which spent acid is also charged, crystallizing the spent acid at a low temperature by the vaporization of the liquefied normally gaseous hydrocarbon thus producing sulfuric acid crystals and a mother liquor, separating the mother liquor from the sulfuric acid crystals, washing the sulfuric acid crystals with a portion of the liquefied normally gaseous hydrocarbon fraction, passing the spent wash liquor to a mixing zone, passing the separated mother liquor to the mixing zone, passing the vaporized normally gaseous hydrocarbon to the mixing zone, discharging from the mixing zone the mother liquor, and passing the vaporized normally gaseous hydrocarbon from the mixing zone to the alkylation zone.

2. In an alkylation process wherein a normally liquid isoparaffin is reacted with an olefin in an alkylation zone to produce an alkylate by means of sulfuric acid and a normally gaseous paraffinic hydrocarbon is present in at least one of the reactant streams, the sulfuric acid becomes spent and at least part of the normally gaseous hydrocarbon and the normally liquid paraffinic hydrocarbon are vaporized, the improvement which comprises subjecting the mixture of vaporized normally gaseous hydrocarbon and vaporized normally liquid paraffinic hydrocarbon to a treatment in a separation zone for the production of a vaporized normally gaseous paraffinic hydrocarbon fraction and a condensed normally gaseous paraffinic hydrocarbon fraction, passing a portion of the condensed normally gaseous hydrocarbon fraction to a mixing zone, passing a portion of condensed normally gaseous hydrocarbon fraction to a crystallization zone to which spent acid is also charged, crystallizing the spent acid at low temperature by the vaporization of the condensed normally gaseous hydrocarbons to produce sulfuric acid crystals and mother liquor, passing the vaporized normally gaseous hydrocarbon to the mixing zone, using a portion of the condensed normally gaseous hydrocarbon fraction to wash the sulfuric acid crystals, passing the spent wash liquor to the mixing zone along with the mother liquor, contacting the vaporized normally gaseous paraffinic hydrocarbon fraction indirectly with sulfuric acid crystals and thereby exchanging heat to melt the crystals and to condense the normally gaseous hydrocarbons, passing the condensed hydrocarbon to the mixing zone, passing vaporized normally gaseous hydrocarbons from the mixing zone to the alkylation zone, discharging mother liquor from the mixing zone, passing condensed normally gaseous hydrocarbon to the crystallization zone, and employing the melted sulfuric acid in the aforesaid alkylation reaction.

3. In an alkylation process where a normally liquid isoparaffin is reacted with an olefin in an alkylation zone to produce an alkylate by means of sulfuric acid and a normally gaseous paraffinic hydrocarbon is present in at least one of the reactant streams, the sulfuric acid becomes spent and at least part of the normally gaseous hydrocarbon and the normally liquid paraffinic hydrocarbon are vaporized, the improvement which comprises condensing the vaporous hydrocarbons, subjecting at least a portion of the condensed hydrocarbons to a treatment in a separation zone for the production of a liquefied normally gaseous hydrocarbon fraction, passing a portion of the liquefied normally gaseous hydrocarbon fraction to a mixing zone, passing a portion of the condensed hydrocarbons to the mixing zone, passing liquefied normally gaseous hydrocarbon and normally liquid hydrocarbon from the mixing zone to a crystallization zone to which spent acid is also charged, crystallizing the spent acid at low temperature by vaporization of the hydrocarbons from the mixing zone, and passing vaporized hydrocarbons from the crystallization zone to the mixing zone.

4. In an alkylation process wherein a normally liquid isoparaffin is reacted with an olefin in the presence of sulfuric acid and sulfuric acid contaminated with impurities is thereby produced, the improvement which comprises passing contaminated acid to a crystallization zone wherein crystals of sulfuric acid are produced, passing a liquefied normally gaseous hydrocarbon present in at least one of the reactant streams and obtained from the alkylation reaction to a mixing separation zone, passing a stream comprising said liquefied normally gaseous hydrocarbon from the mixing and separation zone to the crystallization zone and maintaining a crystallization temperature therein by vaporization of liquefied normally gaseous hydrocarbon, and passing vaporized hydrocarbon from the crystallization zone to the mixing and separation zone.

5. In an alkylation process wherein a normally liquid isoparaffin is reacted with an olefin in the presence of sulfuric acid and sulfuric acid contaminated with impurities is thereby produced, the improvement which comprises passing contaminated acid to a crystallization zone wherein crystals of sulfuric acid are produced, passing a liquefied normally gaseous hydrocarbon present in at least one of the reactant streams and obtained from the alkylation reaction to a mixing and separation zone, passing a normally liquid hydrocarbon present in at least one of the reactant streams and obtained from the alkylation reactant to the mixing and separation zone, passing a stream comprising said liquefied stream of normally gaseous and normally liquid hydrocarbons from the mixing and separation zone to the crystallization zone and maintaining a crystallization temperature therein by vaporization of liquefied hydrocarbons, and passing vaporized hydrocarbons and liquid hydrocarbons from the crystallization zone to the mixing and separation zone.

6. The process according to claim 5 in which the normally liquid hydrocarbon contains four carbon atoms and the normally gaseous hydrocarbon contains three carbon atoms.

References Cited in the file of this patent
UNITED STATES PATENTS

| | | |
|---|---|---|
| 2,320,199 | Sellmeyer | May 25, 1943 |
| 2,366,627 | Kemp | Jan. 2, 1945 |
| 2,429,205 | Jenny et al. | Oct. 21, 1947 |
| 2,441,249 | Ocon et al. | May 11, 1948 |
| 2,593,128 | Felter | Apr. 15, 1952 |
| 2,618,669 | Mrstik | Nov. 18, 1952 |
| 2,649,486 | Putney | Aug. 18, 1953 |
| 2,716,592 | Skelly et al. | Aug. 30, 1955 |